(12) United States Patent
Huang

(10) Patent No.: US 11,243,176 B2
(45) Date of Patent: Feb. 8, 2022

(54) AUTOMATIC EXPOSURE CONTROL METHOD AND AUTOMATIC EXPOSURE CONTROL COMPONENT SYSTEM

(71) Applicant: IRAY TECHNOLOGY COMPANY LIMITED, Shanghai (CN)

(72) Inventor: Yimin Huang, Shanghai (CN)

(73) Assignee: IRAY TECHNOLOGY COMPANY LIMITED, Shanghai (CN)

( * ) Notice: Subject to any disclaimer, the term of this patent is extended or adjusted under 35 U.S.C. 154(b) by 167 days.

(21) Appl. No.: 16/796,949

(22) Filed: Feb. 21, 2020

(65) Prior Publication Data

US 2020/0292473 A1 Sep. 17, 2020

(30) Foreign Application Priority Data

Mar. 11, 2019 (CN) .......................... 2019101792142

(51) Int. Cl.
*G01N 23/00* (2006.01)
*G01N 23/04* (2018.01)
*H05G 1/38* (2006.01)

(52) U.S. Cl.
CPC ............... *G01N 23/04* (2013.01); *H05G 1/38* (2013.01)

(58) Field of Classification Search
CPC .................................. H05G 1/38; H05G 1/42
See application file for complete search history.

(56) References Cited

U.S. PATENT DOCUMENTS

2015/0078528 A1\* 3/2015 Okada ..................... H05G 1/44
378/97

\* cited by examiner

*Primary Examiner* — Dani Fox

(57) ABSTRACT

The present disclosure provides an automatic exposure control method, including: providing an object to be tested; providing an image sensor, including a photosensitive element array composed of a plurality of photosensitive elements arranged in an array, and the photosensitive element array includes at least a plurality of first photosensitive elements and a plurality of second photosensitive elements; turning on the radiation source, and the first readout signals on the first photosensitive elements are read after exposing the area to be tested for the first preset time; continuing the exposure for the second preset time, turning off the photosensitive elements and reading the second readout signals on the second photosensitive elements; acquiring the preset dose threshold of the area to be tested based on the second and first readout signals, and obtaining the remaining time to reach the preset radiation dose to control the exposure of the radiation source.

18 Claims, 5 Drawing Sheets

AUTOMATIC EXPOSURE CONTROL METHOD AND AUTOMATIC EXPOSURE CONTROL COMPONENT SYSTEM

CROSS REFERENCE TO RELATED APPLICATION

This application claims the benefits of priority to Chinese Patent Application No. CN 2019101792142, entitled "Automatic Exposure Control Method and Automatic Exposure Control Component System", filed with CNIPA on Mar. 11, 2019, the contents of which are incorporated herein by reference in its entirety.

BACKGROUND

Field of Disclosure

The present disclosure relates to the technical field of radiation detection, and in particular, to an automatic exposure control method and an automatic exposure control component system.

Description of Related Arts

X-ray imaging systems using radiation such as X-rays are used in the traditional medical field. The X-ray imaging system includes: an X-ray generation device equipped with an X-ray source that generates X-rays; and an X-ray imaging device. The X-ray imaging device receives the radiation of X-rays that are generated by the X-ray source and transmit through the subject to photograph the X-ray image. The X-ray image represents the image information of the subject. Digital Radiography (DR) is a new X-ray photography technology developed in the 1990s. With its remarkable advantages such as faster imaging speed, more convenient operation and higher imaging resolution, DR has become the leading direction of digital X-ray photography technology, and has been recognized by clinical institutions and imaging experts from all over the world. However, X-ray and other ray shooting have ionizing radiation damages to the human body. Reducing the radiation dose received by the human body is the key to the X-ray imaging system. Through automatic exposure control, the radiation dose received by human body may be effectively controlled to avoid overdose. At present, the automatic exposure control function has gradually become the trend and standard of X-ray medical imaging system.

However, most existing schemes use vacuum ionization chambers in front of detectors to detect radiation transmitted through areas of interest of the body. When the detected dose value is greater than the set threshold value, the output signal of the vacuum ionization chamber would cause the high voltage generator to brake the X-ray and terminate the exposure. However, the vacuum ionization chamber may absorb X-rays, and the location where the ionization chamber exists may result in a loss of dose reaching the X-ray detector, thereby forming an ionization chamber shadow on the image, which affects the clinical diagnosis. Although there are a variety of algorithms that can correct the ionization chamber image within a certain spectrum, when the setting of X-ray energy spectrum changes greatly or the incident angle changes greatly, the calibration may easily fail, and the ionization chamber and the detector are generally installed separately, making mobile applications more inconvenient. The real-time performance of the break signals in some automatic exposure control systems is affected by the delay of the signal transmission link. Due to the poor accuracy of the dose brake or the special design requirements for the image sensor, it is a difficult project. The location of the region of interest is subject to the arrangement of special pixels, which makes it difficult to adjust flexibly and achieve in the case of high-resolution image sensors (where the size of the pixels is smaller and the pixel spacing is smaller). Some automatic exposure control systems ignore the dose rate deviation generated during the climbing period of voltage and current of the bulb tube when the X-rays are created.

SUMMARY OF THE PRESENT DISCLOSURE

The present disclosure provide an automatic exposure control method and an automatic exposure control component system, for solving the problems such as ionization chamber shadow caused by the ionization chamber, the unstable dose rate during the climbing period of voltage and current of the bulb tube at the initial stage of X-ray generation, and the control error caused by the signal transmission delay due to the long automatic exposure control time.

The present disclosure provides an automatic exposure control method, including: providing an object to be tested, the object to be tested includes at least one area to be tested; providing an image sensor, the image sensor is placed to correspond with the area to be tested, and comprises a photosensitive element array composed of a plurality of photosensitive elements arranged in an array, and the photosensitive element array comprises at least a plurality of first photosensitive elements and a plurality of second photosensitive elements; obtaining first readout signals by turning on a radiation source, opening the photosensitive elements, and reading out signals on the first photosensitive elements after exposing the area to be tested for a first preset time; obtaining second readout signals by keeping the radiation source to continue exposing the area to be tested for a second preset time, turning off the photosensitive elements and reading out the signals on the second photosensitive elements; and acquiring a preset dose threshold of the area to be tested based on the second readout signals and the first readout signals, and acquiring the remaining time when the area to be tested reaches the preset radiation dose ray radiation based on the preset dose threshold, so as to control the exposure of the radiation source based on the remaining time.

As an alternative to the present disclosure, before turning on the radiation source, the method further includes: controlling all of the photosensitive elements to be turned off to obtain signals of the first photosensitive elements in an unexposed state to obtain first signal background values, and obtain signal of the second photosensitive elements in an unexposed state to obtain second signal background values, a difference between the first readout signal and the first signal background value constitutes a first readout signal increment, a difference between the second readout signal and the second signal background value constitutes a second readout signal increment, and the preset dose threshold of the area to be tested is obtained based on the second readout signal increment and the first readout signal increment.

As an alternative to the present disclosure, the preset dose threshold includes either of a dose rate and a gray value change rate, the preset dose threshold is obtained by the ratio of the difference between the second readout signal increment and the first readout signal increment to the difference between the second preset time and the first preset time.

As an alternative to the present disclosure, the number of the first photosensitive elements has a one-to-one correspondence with the number of the second photosensitive elements, and obtaining the difference between the second readout signal increment and the first readout signal increment includes calculating the difference value between each second photosensitive element and the corresponding first photosensitive element and taking the average of the difference values.

As an alternative to the present disclosure, the manners of controlling the exposure of the radiation source based on the remaining time include controlling the exposure of the radiation source by a correction value of the remaining time.

As an alternative to the present disclosure, the first preset time is in a range from 10 to 900 microseconds, and the second preset time is in a range from 10 to 900 microseconds.

As an alternative to the present disclosure, each of the first photosensitive elements is composed of a column of the photosensitive elements, and each of the second photosensitive elements is composed of a column of the photosensitive elements, and the first photosensitive elements and the second photosensitive elements are alternately patterned at intervals or arranged side by side; or the photosensitive element array further includes at least a plurality of third photosensitive elements, each of the third photosensitive elements is composed of a column of the photosensitive elements, and the first photosensitive elements, the second photosensitive elements, and the third photosensitive elements are alternately patterned at intervals or arranged side by side.

As an alternative of the present disclosure, obtaining the first readout signals by opening the photosensitive elements includes one of the following: turning on the photosensitive elements simultaneously, row-by-row or column-by-column, or group-by-group; the number of the photosensitive elements opened during obtaining the first readout signals by opening the photosensitive elements includes either of opening the photosensitive elements in the whole area to be tested and opening the photosensitive elements in partial rows in the area to be tested.

As an alternative of the present disclosure, the signals on the first photosensitive elements are read out through a plurality of first readout circuits, the signals on the second photosensitive elements are read out through a plurality of second readout circuits, each of the first photosensitive elements is composed of a column of the photosensitive elements, and each column of the photosensitive elements that constitute the first photosensitive elements is electrically connected with one of the first readout circuits through a first signal line, each of the second photosensitive elements is composed of a column of the photosensitive elements, and each column of the photosensitive elements that constitute the second photosensitive elements is electrically connected with one of the second readout circuits through a second signal line.

As an alternative of the present disclosure, opening the photosensitive elements and reading out the signals on the first photosensitive elements includes: reading out the signals on the first photosensitive elements after opening the photosensitive elements for a preset opening time and turning off the photosensitive elements, wherein the cut-off of the preset opening time is consistent with the cut-off of the first preset time, and turning off the photosensitive elements and wait for a preset waiting time to turn on the photosensitive elements again.

As an alternative to the present disclosure, the preset waiting time is less than the second preset time, and the preset waiting time is in a range from tens to hundreds of microseconds.

The present disclosure also provides an automatic exposure control component system, including: a radiation source; an object to be tested placed to correspond with the radiation source, the object to be tested and the radiation source are spaced by an interval from each other, and the object to be tested comprises at least one area to be tested; an image sensor placed to correspond with the area to be tested, the image sensor includes a photosensitive element array composed of a plurality of photosensitive elements arranged in an array, and the photosensitive element array includes at least a plurality of first photosensitive elements and a plurality of second photosensitive elements; a switch drive component connected with the sensor to control the opening and closing of the photosensitive elements; and a data processing control component connected with the image sensor and the radiation source respectively, to acquire a preset dose threshold of the area to be tested based on at least first readout signals on the first photosensitive elements and second readout signals on the second photosensitive elements, and to acquire a remaining time when the area to be tested reaches a preset radiation dose ray radiation based on the preset dose threshold, to control exposure of the radiation source based on the remaining time.

As an alternative of the present disclosure, the data processing control component includes a first signal acquisition module and a second signal acquisition module, the first signal acquisition module is configured to obtain the first readout signals through exposing the area to be tested for a first preset time by the radiation source, and the second signal acquisition module is configured to obtain the second readout signals through continuously exposing the area to be tested for a second preset time after exposing the area to be tested for the first preset time by the radiation source.

As an alternative to the present disclosure, the first signal acquisition module includes a plurality of first readout circuits, and the first signal acquisition module includes a plurality of second readout circuits, wherein each of the first photosensitive elements is composed of a column of the photosensitive elements, and each column of the photosensitive elements that constitute the first photosensitive elements is electrically connected with one of first readout circuits through a first signal line; each of the second photosensitive elements is composed of a column of the photosensitive elements, and each column of the photosensitive elements that constitute the second photosensitive elements is electrically connected with one of second readout circuits through a second signal line.

As an alternative to the present disclosure, the data processing control component includes a preset dose threshold acquisition module, the preset dose threshold acquisition module is connected with the first signal acquisition module and the second signal acquisition module, and is configured to acquire the preset dose threshold based on the first readout signals and the second readout signals, the preset dose threshold acquisition module acquires the preset dose threshold through the first readout signal increment and the second readout signal increment, and the difference between the first readout signal and the first signal background value constitutes the first readout signal increment, the difference between the second readout signal and the second signal background value constitutes the second readout signal increment, the signals of the first photosensitive elements obtained under the condition of no exposure by turning off all the photosensitive elements before the radiation source is opened constitute the first signal background values, and the signals of the second photosensitive elements obtained under the condition of no exposure by turning off all the photosensitive elements before the radiation source is opened constitute the second signal background values.

As an alternative of the present disclosure, the data processing component further includes a data processing module and a transmission control module, the data processing module is connected with the preset dose threshold acquisition module to acquire the remaining time when the area to be tested reaches the preset radiation dose ray radiation based on the output result of the preset dose threshold module, the transmission control module includes a high voltage control device or an upper computer, the transmission control module is connected with the data processing module and the radiation source, respectively, so as to receive the result of the data processing module and control the exposure of the radiation source based on the result.

As an alternative to the present disclosure, the automatic exposure control component system further includes a support component for carrying at least the image sensor, the switch drive component, the first signal acquisition module, the second signal acquisition module, the preset dose threshold acquisition module, and the data processing module, wherein at least the image sensor, the switch drive component, the first signal acquisition module, the second signal acquisition module, the preset dose threshold acquisition module, the data processing module and the support component constitute a detector device, the detector device is placed below a side of the object to be tested away from the radiation source, and the detector device is connected with the transmission control module.

As an alternative to the present disclosure, each of the first photosensitive elements is composed of a column of the photosensitive elements, and each of the second photosensitive elements is composed of a column of the photosensitive elements, and the first photosensitive elements and the second photosensitive elements are alternately patterned at intervals or arranged side by side; or the photosensitive element array further includes at least a plurality of third photosensitive elements, each of the third photosensitive elements is composed of a column of the photosensitive elements, and the first photosensitive elements, the second photosensitive elements, and the third photosensitive elements are alternately patterned at intervals or arranged side by side As described above, the automatic exposure control method and the automatic exposure control component system of the present disclosure directly utilize the image sensor, and realize the exposure dose detection function through a specially designed scanning drive and signal readout mode in combination with a relevant judgment algorithm, both readout signals contain the dose generated during the voltage climbing period, so that the difference between the two signals is the dose value generated during the ray stabilization period, and the calculated value of the dose rate is greatly improved compared with the traditional method due to the removal of the signals generated during the unstable voltage climbing period. In addition, both readout times are designed at the level of 100 microseconds, which is far less than the exposure time of clinical radiography (milliseconds to hundreds of milliseconds), so the dose detection results may be obtained in time without manual estimation of exposure time, which improves the automation level of dose detection. The time interval between two acquisitions may be reduced through reasonable timing design, thereby achieving rapid dose detection.

DESCRIPTION OF REFERENCE NUMERALS

Figure 1:
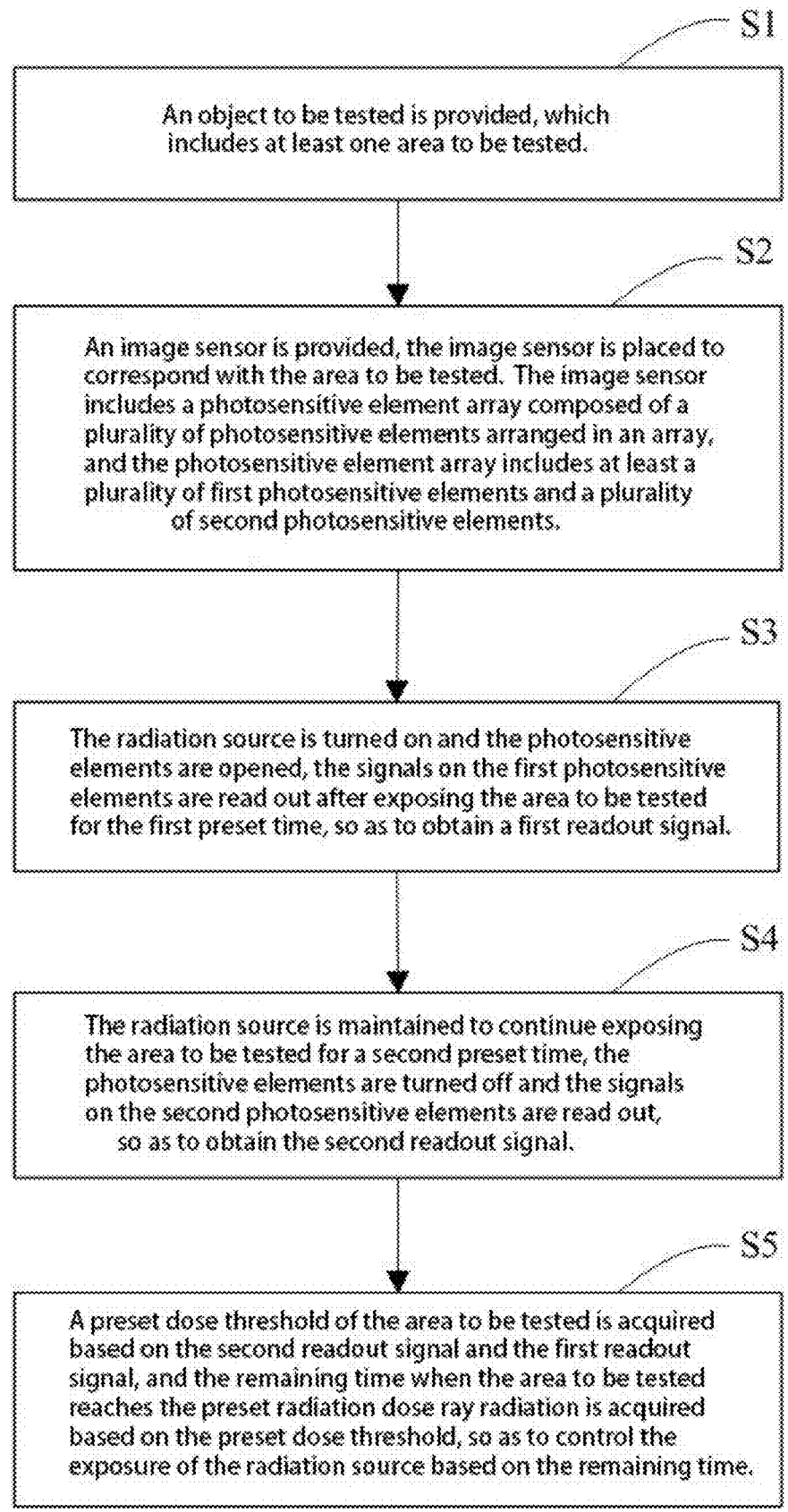
FIG. 1 is a flow chart showing an automatic exposure control method according to an embodiment of the present disclosure.

100 Image sensor
101 Detecting area
102 Photosensitive element
103 First photosensitive element
104 Second photosensitive element
105 First readout circuit
106 Second readout circuit
107 Third photosensitive element
108 Radiation source
109 Object to be tested
110 High voltage control device
200 First readout signal
201 Second readout signal
202 First signal background value
203 Second signal background value
301 Scintillator
302 Related circuit
303 Transmission interface or module
304 Support component
400 Switch drive component
401 Switch drive line
402 Signal line
403 Readout control switch
404 Photodiode
500 Detector device
600 X-ray source
601 human body
602 Vacuum ionization chamber
603 detector 604 High voltage generator
S1~S5 operations

DETAILED DESCRIPTION OF THE PREFERRED EMBODIMENTS

The embodiments of the present disclosure will be described below. Those skilled in the art can easily understand other advantages and effects of the present disclosure according to contents disclosed by the specification. The present disclosure can also be implemented or applied through other different specific implementation modes. Various modifications or changes can also be made to all details in the specification based on different points of view and applications without departing from the spirit of the present disclosure.

Referring to FIGS. 1-10. It needs to be stated that the drawings provided in the following embodiments are just used for schematically describing the basic concept of the present disclosure, thus only illustrating components only related to the present disclosure and are not drawn according to the numbers, shapes and sizes of components during actual implementation, the configuration, number and scale of each component during actual implementation thereof may be freely changed, and the component layout configuration thereof may be more complex.

As shown in FIGS. 1-9, the present disclosure provides an automatic exposure control method, including: providing an object to be tested, the object to be tested includes at least one area to be tested; providing an image sensor, the image sensor is placed to correspond with the area to be tested, and comprises a photosensitive element array composed of a plurality of photosensitive elements arranged in an array, and the photosensitive element array comprises at least a plurality of first photosensitive elements and a plurality of second photosensitive elements; obtaining first readout signals by turning on a radiation source, opening the photosensitive elements, and reading out signals on the first photosensitive elements after exposing the area to be tested for a first preset time; obtaining second readout signals by keeping the radiation source to continue exposing the area to be tested for a second preset time, turning off the photosensitive elements and reading out the signals on the second photosensitive elements; and acquiring a preset dose threshold of the area to be tested based on the second readout signals and the first readout signals, and acquiring the remaining time when the area to be tested reaches the preset radiation dose ray radiation based on the preset dose threshold, so as to control the exposure of the radiation source based on the remaining time.

The operations of the automatic exposure control method of the present disclosure will be described in detail in the following in combination with the drawings. FIG. 1 only provides an example of the automatic exposure control method, and the implementation sequence of the operations may be replaced according to the actual needs.

First, as shown in S1 in FIG. 1, and referring to FIGS. 2-9, an object to be tested 109 is provided, which includes at least one area to be tested.

Figure 2:
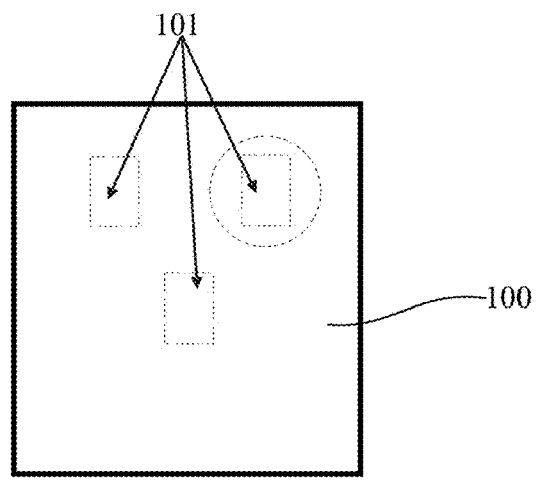
FIG. 2 is a schematic diagram showing an image sensor forming a detecting area corresponding to the object to be tested according to an embodiment of the present disclosure.

Specifically, the object to be tested 109 includes an object that needs to be detected by radiation, which includes at least one area to be tested that needs to be detected. For occasions requiring automatic exposure control, it is necessary to select different numbers and different locations of the region of interest (the area to be tested) for detection according to different shooting positions and different X-ray system configuration requirements. In one example, there may be three fields of view (three areas to be tested) and five fields of view (five areas to be tested) for detection. In the present disclosure, one of the fields of view is selected for principle description, and the same method may be used for detection of other fields of view, which may be detected simultaneously or separately. Referring to FIG. 2, it is shown that there are three areas to be tested on the object to be tested, and the three areas to be tested correspond to the position and shape of the image sensor 100, that is, the formed detecting area 101.

Figure 3:
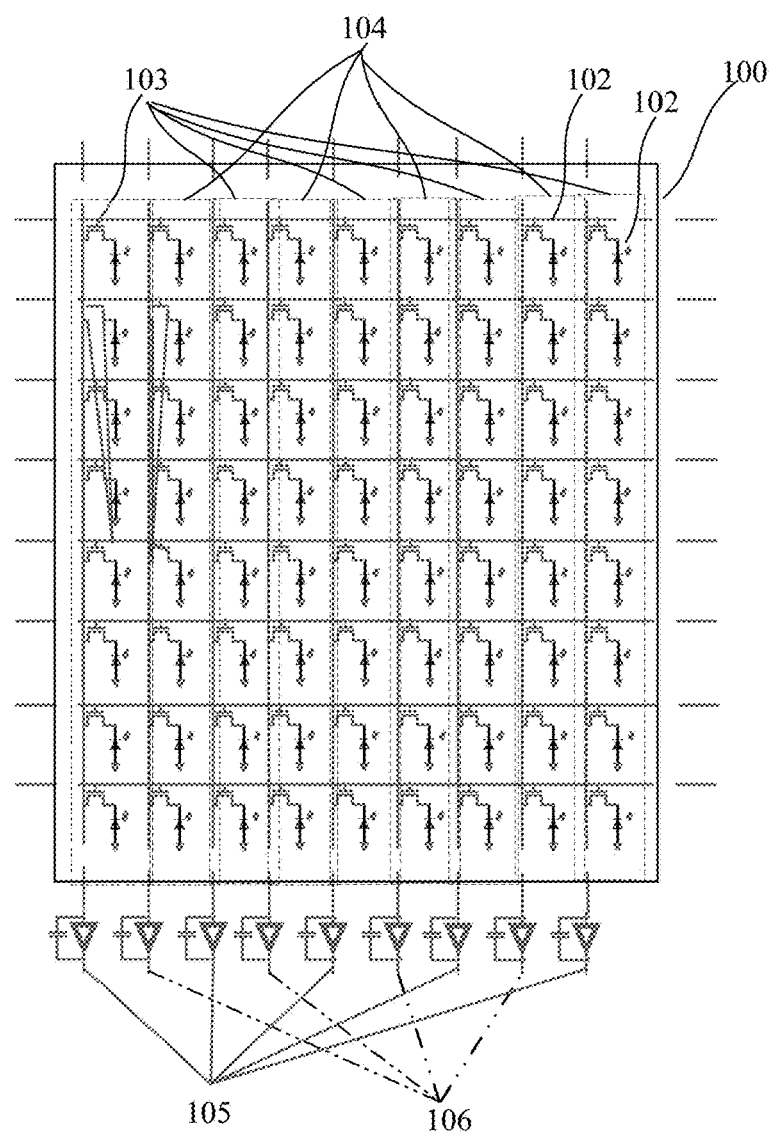
FIG. 3 is a schematic diagram showing the photosensitive element arrangement of the image sensor according to an embodiment of the present disclosure.

In addition, an image sensor 100 is provided as described in S2 of FIG. 1 and FIG. 3, the image sensor 100 is placed to correspond with the area to be tested. The image sensor 100 includes a photosensitive element array composed of a plurality of photosensitive elements 102 arranged in an array, and the photosensitive element array includes at least a plurality of first photosensitive elements 103 and a plurality of second photosensitive elements 104.

As an example, the first photosensitive elements 103 and the second photosensitive elements 104 are alternately patterned at intervals or arranged side by side.

As an example, the photosensitive element array further includes at least a plurality of third photosensitive elements 107, each of the third photosensitive elements is composed of a column of the photosensitive elements. The first photosensitive elements 103, the second photosensitive elements 104, and the third photosensitive elements 107 are alternately patterned at intervals or arranged side by side.

Specifically, the present disclosure realizes automatic exposure control of radiation based on the image sensor 100, the image sensor 100 is placed to correspond with the area to be tested. For example, in the correspondingly formed detecting area 101, the image sensor 100 includes a plurality of photosensitive elements 102 arranged in an array, as shown in FIG. 3, in an example, the photosensitive elements 102 are divided into two groups, one is the first photosensitive elements 103, and the other is the second photosensitive elements 104. In a further alternative example, the first photosensitive elements 103 are composed of a plurality of columns of the photosensitive elements 102, and each of the first photosensitive elements 103 is composed of a column of the photosensitive elements 102, the second photosensitive elements 104 are composed of a plurality of columns of the photosensitive elements 102, and each of the second photosensitive elements 104 is composed of a column of the photosensitive elements 102, that is, the photosensitive elements 102 are grouped by columns into a plurality of columns of the first photosensitive elements 103 and a plurality of columns of the second photosensitive elements 104. In a preferred example, the number of the first photosensitive elements 103 has a one-to-one correspondence with the number of the second photosensitive elements 104, and they are alternately patterned at intervals. The number of photosensitive elements in each first photosensitive element 103 has a one-to-one correspondence with the number of the photosensitive elements in each second photosensitive element 104, forming an arrangement manner as shown in FIG. 5(a). Since the corresponding first photosensitive element 103 is adjacent to the second photosensitive element 104, it may be considered that the intensity of the exposure (dose rate, etc.) of the two adjacent pixels (photosensitive elements) is the same, and the speed at which the signals are generated is the same.

In addition, the first photosensitive elements 103 and the second photosensitive elements 104 may also be arranged side by side, that is, the photosensitive elements 102 are divided into two parts, such as the first photosensitive elements 103 on the left side and the second photosensitive elements 104 on the right side, and the photosensitive elements on the left side and the photosensitive elements on the right side are arranged side by side. In addition, referring to FIG. 5(b), in an example, the photosensitive elements may also be divided into three groups, that is, the first photosensitive elements 103, the second photosensitive elements 104, and the third photosensitive elements 107. In other examples, it may also be in groups of four or more. After being divided into a plurality of groups, any two of the groups may be selected to obtain the remaining time according to the manner disclosed in the present disclosure, so as to perform the exposure control of the radiation source. After being divided into groups, a plurality of two groups may be selected for calculation, that is, multiple variables obtained by two groups may be obtained. If the photosensitive elements are divided into three groups, more variables may be obtained, such as a first difference between the second group increment and the first group increment, a second difference between the third group increment and the second group increment, and a third difference between the third group increment and the first group increment. In an example, the preset dose threshold may be acquired based on an average of the first difference, the second difference, and the third difference, and then the remaining time is acquired. In another example, the first difference, second difference, and third difference may be fitted to obtain the preset dose threshold and then the remaining time is acquired. If the photosensitive elements are divided into four groups, the difference between the first group and the second group, the difference between the third group and the fourth group, etc., may be obtained. Thus, the more variables obtained, the more favorable it is to accurately judge the breaking time. In groups of three or more, the arrangement of the photosensitive elements after the grouping may be selected according to actual conditions. In an example, the photosensitive elements are divided into three groups: the first photosensitive elements 103, the second photosensitive elements 104 and the third photosensitive elements 107, which are arranged side by side as shown in FIG. 5(b).

Figure 4:
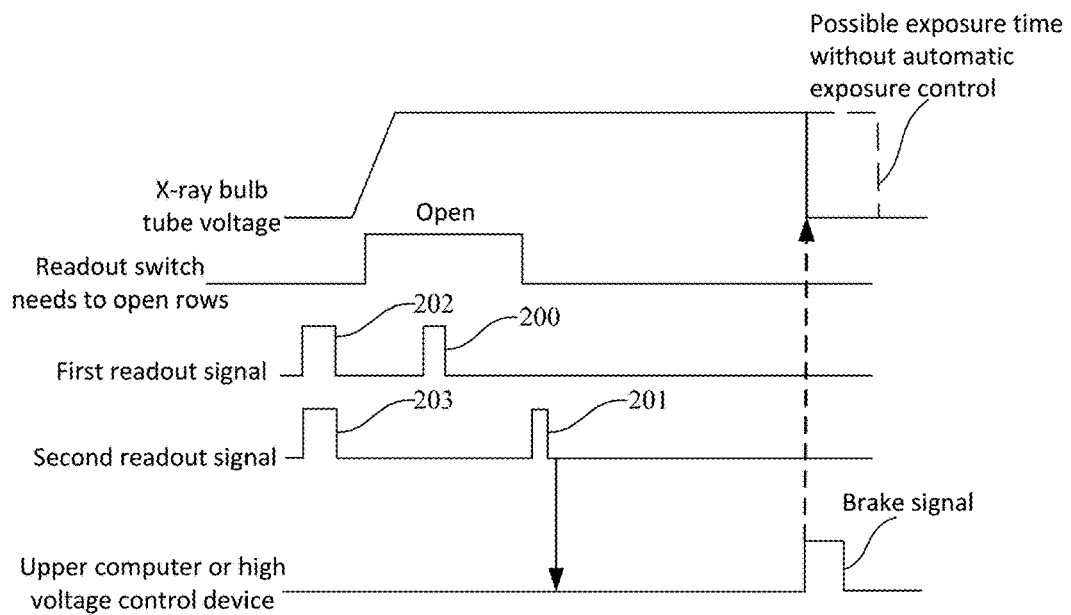
FIG. 4 is a schematic diagram showing a control sequence for performing automatic exposure control according to an embodiment of the present disclosure.

Next, as shown in S3, S4 in FIG. 1 and FIG. 4, the radiation source is turned on and the photosensitive elements are opened, the signals on the first photosensitive elements 103 are read out after exposing the area to be tested for the first preset time t1, so as to obtain a first readout signal 200. The radiation source is maintained to continue exposing the area to be tested for a second preset time t2, the photosensitive elements are turned off and the signals on the second photosensitive elements 104 are read out, so as to obtain the second readout signal 201.

As an example, the first preset time t1 is in a range from 10 to 900 microseconds, and the second preset time t2 is in a range from 10 to 900 microseconds.

Specifically, the present disclosure realizes automatic exposure control of the radiation source based on at least the first photosensitive elements 103 and the second photosensitive elements 104. As shown in FIG. 4, the radiation source is turned on, that is, the X-ray bulb tube voltage is provided, as shown in the first broken line in FIG. 4. In addition, the photosensitive elements 102 are opened to realize the subsequent readout of the signals of the first photosensitive elements 103 and the second photosensitive elements 104. In an example, the photosensitive elements may be opened before the radiation source is opened, or may be simultaneously opened with the radiation source, or may be opened later than the radiation source is opened. However, it is necessary to ensure that the photosensitive elements are opened before the signals are read out, that is, the photosensitive elements are opened within the first preset time, to ensure that the signals in the pixel flow to the signal line, thereby ensuring the readout of the effective signals. In this example, both the photosensitive elements and the radiation source are selected to be simultaneously opened. Further, after exposing for the first preset time t1, the signals on the first photosensitive elements 103 are read out to obtain the first readout signal 200, as shown in the third broken line in FIG. 4. In an example, the first preset time may be a plurality of hundred microseconds. After the first readout signal 200 is read out, the radiation source is kept on for the second preset time t2. During the second preset time t2, a signal output continues in the second photosensitive elements 104. The second photosensitive elements 104 undergoes exposure for the first preset time and the second preset time, the signals on the second photosensitive elements 104 are read out, and the second readout signal 201 is obtained, as shown in the fourth broken line in FIG. 4. The signals on the second photosensitive elements 104 may be read out after the pixel switch is turned off. The pixel switch is turned off, the signals on the pixel are stopped from flowing to the signal line. At this time, the signal of the corresponding signal line on the second photosensitive elements 104 is read out. In an example, the second preset time may be a plurality of hundred microseconds. Both readout times are at the level of 100 microseconds, which is far less than the exposure time of clinical radiography (milliseconds to hundreds of milliseconds), so the dose detection results may be obtained in time without manual estimation of exposure time, which improves the automation level of dose detection. In addition, by performing the above-mentioned timing control, the time interval between two acquisitions may be reduced and rapid dose detection may be achieved. By adopting the method of signal output on the first photosensitive elements and the second photosensitive elements, signal delay and other defects on a single photosensitive element may be reduced. In an example, when the automatic exposure control system further includes a high voltage control device, such as a high voltage generator, the output of the high voltage control device may be guaranteed to stabilize during the second preset time.

Figure 7:
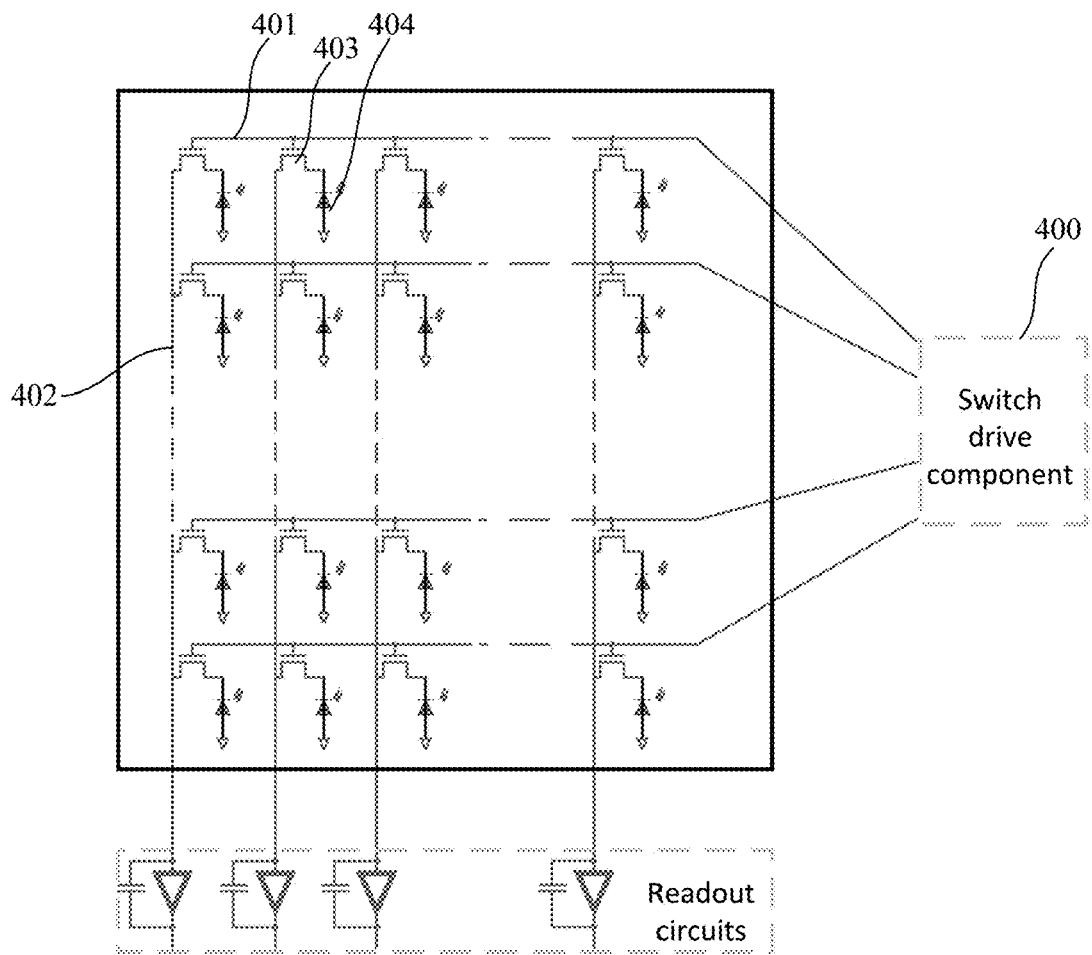
FIG. 7 is a connection schematic diagram showing the driving and readout of the image sensor according to an embodiment of the present disclosure.

In addition, referring to FIG. 7, the opening and closing of the photosensitive elements 102 are controlled based on the switch drive component 400, and the switch drive component 400 is connected with the image sensor. In an example, each row of the photosensitive elements is simultaneously controlled, and the opening and closing of the photosensitive elements are achieved based on a drive circuit. Image sensor related components generally consist of a photodiode array, a switch array and switch control lines, and signal lines. When the drive circuit sets the switch control line to "on", the readout switch connected with the control line will be turned on, the signals on the photodiode are sent to the readout circuit through the signal line, and the readout circuit converts the signals into digital signals. In a specific example, referring to FIG. 7, the photosensitive elements 102 are composed of connected readout control switches 403 and photodiodes 404. Each row of the photosensitive elements 102 is controlled by a switch drive line 401. Each column of the photosensitive elements 102 realizes signal control through a signal line 402.

Finally, as shown in S5 in FIG. 1, a preset dose threshold of the area to be tested is acquired based on the second readout signal 201 and the first readout signal 200, and the remaining time when the area to be tested reaches the preset radiation dose ray radiation is acquired based on the preset dose threshold, so as to control the exposure of the radiation source based on the remaining time.

Specifically, in the automatic exposure control method of the present disclosure, the automatic exposure control of the radiation source is finally realized by the first readout signal 200 and the second readout signal 201, the control method of the present disclosure is realized based on the image sensor 100. The present disclosure directly adopts the detector image sensor as the collector of the incident dose, and does not need to additionally place an ionization chamber or other sensors, thereby avoiding that these sensors form shadows on the image after X-ray absorption, which affects clinical diagnosis. Mobile applications are convenient because there is no need for external exposure detection components, such as vacuum ionization chambers. In addition, in the technical solution of the present disclosure, since both readout signals contain the doses generated during the voltage climbing period, the dose value generated during the X-ray stable period may also be obtained based on the first readout signal and the second readout signal (for example, the difference between the two signals is the dose value generated during the X-ray stable period), so that the calculated value of dose rate is greatly improved compared with the traditional method due to the removal of the signals generated during the voltage climbing period (i.e. X-ray unstable period).

After the preset dose threshold of the area to be tested is acquired based on the second readout signal 201 and the first readout signal 200, the preset dose threshold may be a dose rate R, thereby a remaining time Tr of the preset radiation dose may be obtained. After obtaining the remaining time, the brake of the radiation source is controlled by the remaining time, so as to realize the automatic exposure control, as shown in the fifth broken line in FIG. 4. In an example, the remaining time may be sent to an upper computer or a high voltage control device by a detector device, and the brake operation may be triggered to turn off the X-ray, thereby realizing the dose detection and control. Among them, a possible situation of the possible exposure time without automatic exposure control is shown in the first broken line in FIG. 4.

Specifically, in an example, a preset dose threshold of the area to be tested may be acquired based on a difference between the second readout signal 201 and the first readout signal 200. During turning on process of the pixel switch, the exposure does not stop, and the pixel still generates signals, so that the second readout signal 201 of the second photosensitive elements 104 has an increment $\delta D$ relative to the first readout signal 200 of the first photosensitive elements 103. The increment $\delta D$ is proportional to the time difference $\delta T=t2-t1$ of the acquisition signals of two groups of photosensitive elements, so that the preset dose threshold in the area to be tested may be calculated by $\delta D/\delta T$. In an example, the preset dose threshold of the area to be tested is calculated by $\delta \overline{D}/\delta T$, $\delta \overline{D}$ is a comprehensive quantity after processing all the pixel signals of the area. In an example, the number of the first photosensitive elements 103 has a one-to-one correspondence with the number of the second photosensitive elements 104, and they are alternately patterned at intervals. $\delta \overline{D}$ may be obtained by calculating the differences between the signals of the adjacent second photosensitive elements and the first photosensitive elements at first and then acquiring the average of the differences. For another example, a column of differences may be obtained by calculating the differences between the signals of the first photosensitive elements on the first column and the second photosensitive elements on the second column, and another column of differences may be obtained by calculating the differences between the signals of the first photosensitive elements on the third column and the second photosensitive elements on the fourth column. The rest may be done in the same manner, then each column of differences is taken as a whole to calculate the average.

Specifically, for methods adopting the manner of continuously scanning a row or a plurality of rows of exposure detection area (area of interest), reading out and processing the signals of those rows (for example, accumulating), and generating X-ray brake signals when the processed readout signals exceed a set threshold value, their accuracy of dose detection is limited by the speed of reading the signals of the area of interest, the real-time performance of the brake signal is affected by the delay of the signal transmission link, and the accuracy of the dose brake is poor. The present disclosure may solve the above problems and has obvious advantages. In addition, the present disclosure directly adopts the image sensor pixel, which improves the defect of using some specially designed pixels in the image sensor array as the dose detecting sensor. Such a method requires special design of the image sensor, which is difficult in engineering, and the position of the area of interest is restricted by the arrangement of special pixels, which makes it difficult to adjust flexibly. Thus, it is difficult to realize in the case of high-resolution image sensor (the pixel size is smaller, and the pixel spacing is smaller). In addition, the method of the present disclosure may also eliminate the problem created by the unstable dose rate during the climbing period of voltage and current of the bulb tube at the initial stage of X-ray generation. However, among methods of estimating the time required to reach the remaining dose by reading out the signals of the area of interest in a short time in advance, this method ignores the dose rate deviation generated during the climbing period of voltage and current of the bulb tube when the X-rays are created. When the reading out in advance is too early, the deviation of estimating the remaining time is large. When the reading out in advance is late, it requires to set the ceiling of the exposure time. This method still relies on the experience and skills of the operator, and the automation degree is low.

As an example, the manners of controlling the exposure of the radiation source based on the remaining time include controlling the exposure of the radiation source by a correction value of the remaining time.

As an example, the correction value of the remaining time includes the result of the remaining time minus the transmission delay time.

Specifically, in an example, it may be controlling the exposure of the radiation source based on the remaining time, or controlling braking the radiation source immediately when the remaining time is reached. In another alternative example, it may also be correcting the remaining time to obtain a correction value of the remaining time, and controlling the exposure of the radiation source based on the correction value. The correction value may be selected according to actual conditions. In an example. The remaining time obtained may be further subtracted by a transmission delay time, the transmission delay time may be counted according to a conventional statistical method. For example, according to the calculation of the transmission delay when the detector transmits the remaining time to the high voltage control device, a correction time is finally obtained, which is the correction value. Based on the correction value, the brake operation is triggered to turn off the X-rays, thereby realizing the dose detection and control.

As an example, the preset dose threshold includes either of a dose rate and a gray value change rate. Specifically, the dose threshold obtained based on the first readout signals and the second readout signals is a dose-related value, which may be a dose rate R, or may be a gray value change rate Rg. That is, the dose threshold may be the dose of the received radiation on the first photosensitive elements and the second photosensitive elements obtained based on the first readout signals and the second readout signals. It may also be a gray value change rate. That is, the image gray value is obtained based on the first readout signals and the second readout signals, which is a digital value converted after the pixel signals are read out, thereby obtaining the gray value change rate and calculating remaining time Tr to reach the gray value threshold, that is, the remaining time to reach the preset radiation dose, so as to control the exposure of the radiation source based on the remaining time.

As an example, before turning on the radiation source, the method further includes the operations: controlling all of the photosensitive elements 102 to be turned off to obtain a signal of the first photosensitive elements 103 in an unexposed state to obtain a first signal background value 202, and obtain a signal of the second photosensitive elements 104 in an unexposed state to obtain a second signal background value 203. A difference between the first readout signal 200 and the first signal background value 202 constitutes a first readout signal increment, a difference between the second readout signal 201 and the second signal background value 203 constitutes a second readout signal increment, and the preset dose threshold of the area to be tested is obtained based on the second readout signal increment and the first readout signal increment.

Specifically, in an example, it also includes a process in which all the pixel (photosensitive elements 102) switches of the image sensor 100 are turned off before the exposure, and the readout circuit corresponding to the area to be tested collects the signal line under the condition that all photosensitive elements are closed and not exposed, that is, a process of acquiring the first signal background value 202 and the second signal background value 203, and obtaining the first readout signal increment and the second readout signal increment based on it. That is, a difference between the first readout signal 200 and the first signal background value 202 constitutes a first readout signal increment, and a difference between the second readout signal 201 and the second signal background value 203 constitutes a second readout signal increment, such that the increments represent the increments of signal generated during the exposure process. The preset dose threshold is then acquired based on the increments, for example, the increment OD and a difference between the second readout signal increment of the second photosensitive elements 104 and the first readout signal increment of the first photosensitive elements 103. For the further acquisition of the dose threshold, referring to the above solution described in this example.

As an example, the preset dose threshold includes either of a dose rate and a gray value change rate, the preset dose threshold is obtained by the ratio of the difference between the second readout signal increment and the first readout signal increment to the difference between the second preset time and the first preset time.

As an example, the number of the first photosensitive elements 103 has a one-to-one correspondence with the number of the second photosensitive elements 104, and the method for obtaining the difference between the second readout signal increment and the first readout signal increment includes calculating the difference value between each second photosensitive element and the corresponding first photosensitive element and taking the average of the difference values.

Specifically, the dose threshold obtained based on the first readout signals and the second readout signals is a dose-related value, which may be a dose rate R, or may be a gray value change rate Rg. When sampling the background value, the dose threshold may be acquired based on the first readout signal increment and the second readout signal increment, such as the dose of the received radiation on the first photosensitive elements and the second photosensitive elements. It may also be a gray value change rate. That is, the image gray value may be obtained based on the first readout signal increment and the second readout signal increment, which is a digital value converted after the pixel signal is read out, thereby obtaining the gray value change rate and calculating remaining time Tr to reach the gray value threshold, that is, the remaining time to reach the preset radiation dose, so as to control the exposure of the radiation source based on the remaining time.

Specifically, in an example, a specific photosensitive element grouping arrangement structure and a method for obtaining the preset dose threshold value are provided. For the photosensitive elements 102, in an example, they are divided into two groups, one is the first photosensitive elements 103, and the other is the second photosensitive elements 104. In an example, the numbers of photosensitive elements in the two groups are controlled to correspond one to one, that is, the number of the first photosensitive elements 103 is the same as the number of the second photosensitive elements 104. The difference value between each of the second photosensitive elements 104 and the first photosensitive element 103 corresponding thereto may be calculated first, and the average value of the differences is acquired to obtain a difference between the first readout signal increment and the second readout signal increment. In a further alternative example, each of the first photosensitive elements 103 is composed of a column of the photosensitive elements 102, and each of the second photosensitive elements 104 is composed of a column of the photosensitive elements 102, that is, the photosensitive elements 102 are grouped by columns into a plurality of columns of the first photosensitive elements 103 and a plurality of columns of the second photosensitive elements 104. In a preferred example, the number of the first photosensitive elements 103 has a one-to-one correspondence with the number of the second photosensitive elements 104, the number of the photosensitive elements in each of the first photosensitive elements 103 has a one-to-one correspondence with the number of the photosensitive elements in each of the second photosensitive elements 104, and they are alternately patterned at intervals. In this example, $\delta\overline{D}$ may be obtained by calculating the differences between the signals of the adjacent second photosensitive elements and the first photosensitive elements first, that is, the differences between each of the second photosensitive elements 104 and the first photosensitive element 103 corresponding thereto are calculated first, then the average of the differences is taken. For example, a column of differences may be obtained by calculating the differences between the signal increments of the first photosensitive elements 103 on the first column and the second photosensitive elements 104 on the second column, and another column of differences may be obtained by calculating the differences between the signal increments of the first photosensitive elements 103 on the third column and the second photosensitive elements 104 on the fourth column. The rest may be done in the same manner, then each column of differences is taken as a whole to calculate the average.

As an example, each of the first photosensitive elements 103 is composed of a column of the photosensitive elements 102, each of the second photosensitive elements 104 is composed of a column of the photosensitive elements 102, and the first photosensitive elements and the second photosensitive elements are alternately patterned at intervals or arranged side by side.

As an example, the photosensitive element array further includes at least a plurality of third photosensitive elements, each of the third photosensitive elements is composed of a column of the photosensitive elements. The first photosensitive elements, the second photosensitive elements, and the third photosensitive elements are alternately patterned at intervals or arranged side by side.

As an example, the manner of obtaining the first readout signals by turning on the photosensitive elements 102 includes any of the following: turning on the photosensitive elements simultaneously, row-by-row or group-by-group.

As an example, the number of the photosensitive elements 102 opened in the process of opening the photosensitive elements 102 to obtain the first readout signals includes: opening the photosensitive elements in the whole area to be tested, or opening the photosensitive elements in partial rows in the area to be tested.

Specifically, in an example, as shown by the second broken line in FIG. 4, which represents a readout switch that needs to open a row. As described above, the photosensitive elements may be opened before or after the radiation source is turned on, or at the same time. In an example, the opening manner of the photosensitive elements may be turning on the photosensitive elements simultaneously, row-by-row or column-by-column, or group-by-group. Take all the photosensitive elements being turned on as an example, and take the photosensitive elements being grouped in columns as an example, such as dividing them into two groups that are alternately patterned at intervals. The photosensitive elements may be simultaneously turned on, or the photosensitive elements may be turned on row by row to finally turn on all the photosensitive elements. The photosensitive elements may also be turned on group by group, such as turning on the first photosensitive elements first and then turning on the second photosensitive elements and eventually turning on all the photosensitive elements. In addition, in an example, for the number of the opened photosensitive elements 102, all the photosensitive elements of the entire area to be tested may be opened, or only some of the photosensitive elements may be opened. In the example of opening some of the photosensitive elements, it is necessary to ensure the readout of the first readout signals and the second readout signals. In an alternative example, the photosensitive elements are grouped in columns, grouped into the first photosensitive elements and the second photosensitive elements. At this time, the photosensitive elements of partial rows may be selected to be opened, to ensure an effective signal output.

As an example, the signals on the first photosensitive elements 103 are read out through a plurality of first readout circuits 105, the signals on the second photosensitive elements 104 are read out through a plurality of second readout circuits 106, wherein each of the first photosensitive elements 103 is composed of a column of the photosensitive elements 102, and each column of the photosensitive elements that constitute the first photosensitive elements is electrically connected with one of the first readout circuits 105 through a first signal line, each of the second photosensitive elements 104 is composed of a column of the photosensitive elements 102, and each column of the photosensitive elements that constitute the second photosensitive elements is electrically connected with one of the second readout circuits 106 through a second signal line.

Specifically, referring to FIG. 3 and FIG. 7, the signals on the photosensitive elements are read out by readout circuits. In a specific example, each column of the photosensitive elements corresponds to a readout circuit. When the photosensitive elements are divided into two groups (the first photosensitive elements 103 and the second photosensitive elements 104), the readout circuits are also divided into two groups, the first readout circuits 105 and the second readout circuits 106, which are placed to correspond with the first photosensitive elements 103 and the second photosensitive elements 104, so as to read out the signals on the corresponding photosensitive elements of each column, that is, the first readout signals and the second readout signals.

As an example, the process of opening the photosensitive elements and reading out the signals on the first photosensitive elements 103 includes: reading out the signals on the first photosensitive elements 103 after opening the photosensitive elements for a preset opening time and turning off the photosensitive elements, wherein the cut-off of the preset opening time is consistent with the cut-off of the first preset time, and turning off the photosensitive elements and wait for a preset waiting time to turn on the photosensitive elements again.

As an example, the preset waiting time is less than the second preset time, and the preset waiting time is in a range from tens to hundreds of microseconds.

Figure 6:
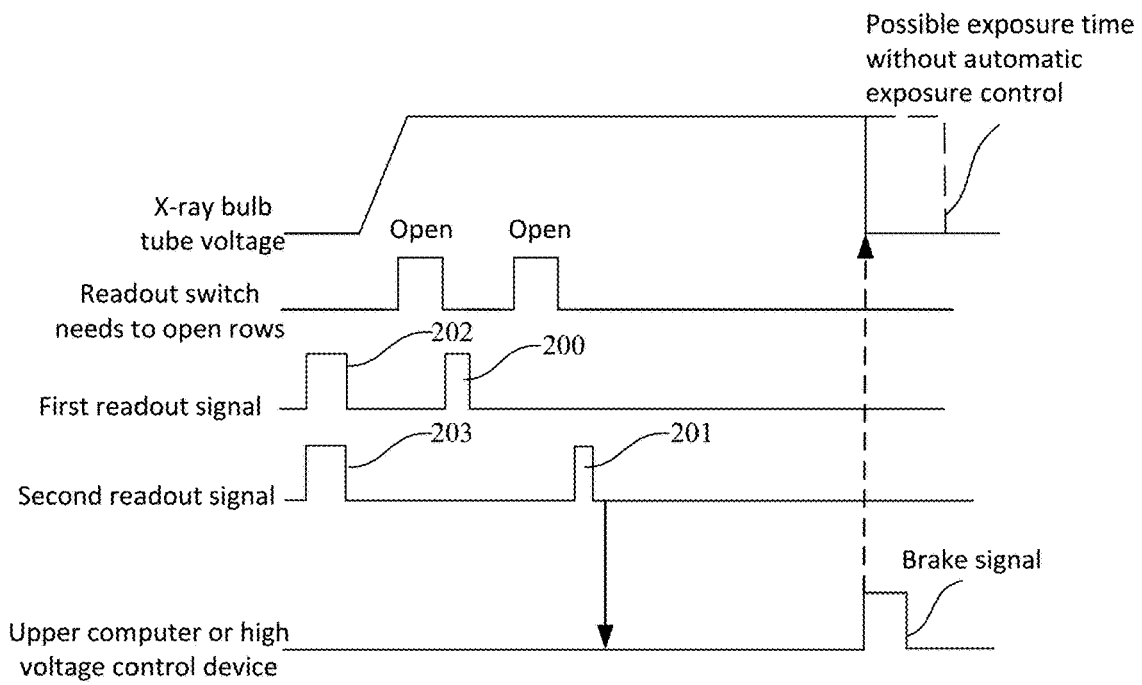
FIG. 6 is a schematic diagram showing another control sequence for performing automatic exposure control according to an embodiment of the present disclosure.

Specifically, in an example, as shown in FIG. 6, a manner of opening the photosensitive elements is provided. In this example, the photosensitive elements are turned on for a preset opening time, and then turned off to read out the first readout signals on the first photosensitive elements, as shown in the first opening of the second broken line in FIG. 6. In an example, the opening of the photosensitive elements may be before or after the radiation source is turned on, or at the same time. After turning off the opened photosensitive elements, wait for a preset waiting time and then turn on the photosensitive elements again, the preset waiting time is as shown in the closing phase between the first opening and the second opening of the second broken line in FIG. 6. The second readout signals on the second photosensitive elements are read out after turning on the photosensitive elements again. In an example, the photosensitive elements opened again are identical to the photosensitive elements opened at the first time. In other examples, it may also be opening partial photosensitive elements that are opened at the first time, which do not affect the reading of the second readout signals and the subsequent acquisition of preset dose threshold. In a specific alternative example, the photosensitive elements may be grouped laterally, and each group is controlled by a different switch drive line, as shown in FIG. 3. It may be that the first row of the photosensitive elements is group A, the second row of the photosensitive elements is group B, the third row of the photosensitive elements is group A, the fourth row of the photosensitive elements is group B, and so on. The photosensitive elements of group A and photosensitive elements of group B belong to the upper row and the lower row respectively, and each row of the photosensitive elements is controlled by a different switch drive line. The specific operation, remaining time acquisition manner and so on may refer to the example of longitudinal grouping. For the way of lateral grouping in this example, by adopting the manner of opening the photosensitive elements twice as shown in FIG. 6 of this example, the switch of each group of photosensitive elements may be flexibly controlled, and the efficiency of automatic exposure control is improved. The preset waiting time is less than the second preset time, to ensure effective readout of the subsequent signals. In addition, in an example, the preset waiting time is in a range from tens to hundreds of microseconds, such as 20 to 900 microseconds.

Figure 8:
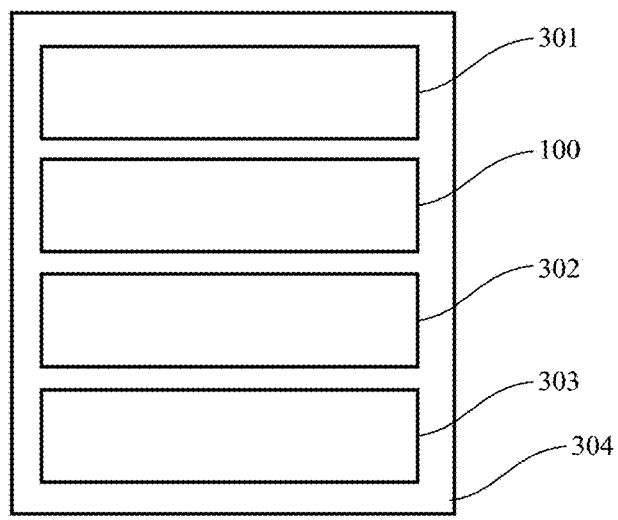
FIG. 8 is a schematic diagram showing the construction of a detector device according to an embodiment of the present disclosure.
Figure 9:
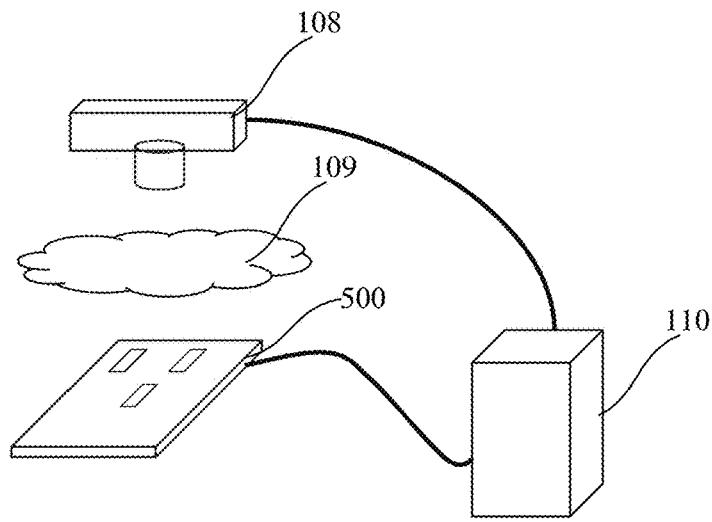
FIG. 9 is a schematic diagram showing the structure of an automatic exposure control component system according to an embodiment of the present disclosure.

As shown in FIGS. 7-9, referring to FIGS. 1-6, the present disclosure further provides an automatic exposure control component system, the automatic exposure control system preferably uses the automatic exposure control method provided by the present disclosure to perform automatic exposure of a radiation source. The automatic exposure control component system includes: a radiation source 108; an object to be tested 109 that is placed to correspond with the radiation source 108, the object to be tested 109 and the radiation source 108 are spaced by an interval from each other, and the object to be tested 109 includes at least one area to be tested; an image sensor 100 placed to correspond with the area to be tested, the image sensor 100 includes a photosensitive element array composed of a plurality of photosensitive elements 102 arranged in an array, and the photosensitive element array includes at least a plurality of first photosensitive elements 103 and a plurality of second photosensitive elements 104; a switch drive component 400 connected with the sensor to control the opening and closing of the photosensitive elements; a data processing control component connected with the image sensor 100 and the radiation source 108, respectively, so as to acquire the information on the photosensitive elements 102, and at least acquire a preset dose threshold of the area to be tested based on the acquired first readout signal 200 on the first photosensitive elements 103 and the second readout signal 201 on the second photosensitive elements 104, and acquire a remaining time when the area to be tested reaches a preset radiation dose ray radiation based on the preset dose threshold, to control exposure of the radiation source based on the remaining time.

Specifically, referring to FIG. 9, the present disclosure provides an automatic exposure control component system including the radiation source 108 for emitting radiation, such as an X-ray generating device. In addition, the control component system further includes an object to be tested 109, the object to be tested 109 includes an object to be detected by radiation, which includes at least one area to be tested. For occasions requiring automatic exposure control, according to different shooting positions and different X-ray system configuration requirements, it is necessary to select different numbers and different locations of the region of interest (the area to be tested) for detection. In one example there may be three fields of view (three of the areas to be tested) and five fields of view (five of the areas to be tested) for detection. In the present disclosure, one of the fields of view is selected for principle description, and the same method may be used for detection of other fields of view, which may be detected simultaneously or separately. Referring to FIG. 2 and FIG. 9, it is shown that there are three areas to be tested on the object to be tested, and the three areas to be tested correspond to the position and shape of the image sensor 100, that is, the formed detecting area 101.

In addition, the automatic exposure control component system further includes an image sensor 100 placed to correspond with the area to be tested. The image sensor 100 includes a photosensitive element array composed of a plurality of photosensitive elements 102 arranged in an array, and the photosensitive element array includes at least a plurality of first photosensitive elements 103 and a plurality of second photosensitive elements 104.

As an example, the first photosensitive elements 103 and the second photosensitive elements 104 are alternately patterned at intervals or arranged side by side.

As an example, the photosensitive element array further includes at least a plurality of third photosensitive elements 107, each of the third photosensitive elements is composed of a column of the photosensitive elements. The first photosensitive elements 103, the second photosensitive elements 104, and the third photosensitive elements 107 are alternately patterned at intervals or arranged side by side.

Figure 5:
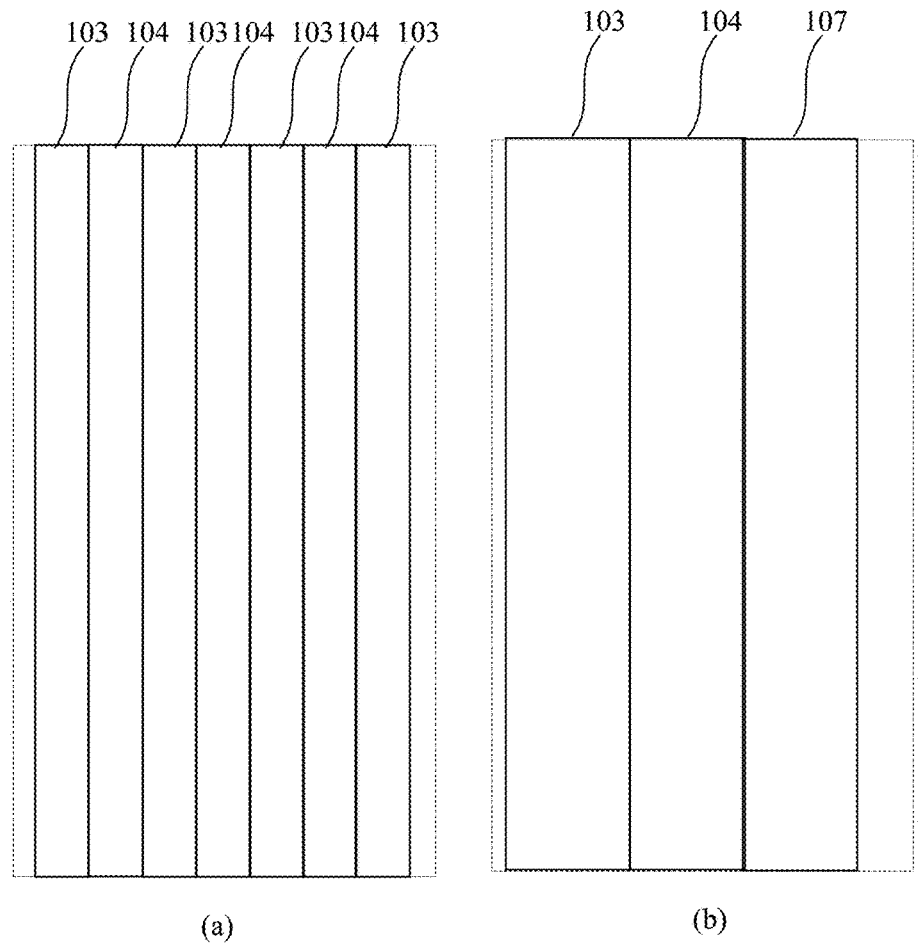
FIG. 5 is a schematic diagram showing the photosensitive element grouping arrangement according to an embodiment of the present disclosure.

Specifically, the present disclosure realizes automatic exposure control of radiation based on the image sensor 100, the image sensor 100 is placed to correspond with the area to be tested. For example, in the correspondingly formed detecting area 101, the image sensor 100 includes a photosensitive element array composed of a plurality of photosensitive elements 102 arranged in an array, as shown in FIG. 3. In an example, the photosensitive elements 102 are divided into two groups, one is the first photosensitive elements 103, and the other is the second photosensitive elements 104. In a further alternative example, each of the first photosensitive elements 103 is composed of a column of the photosensitive elements 102, and each of the second photosensitive elements 104 is composed of a column of the photosensitive elements 102, that is, the photosensitive elements 102 are grouped by columns into a plurality of columns of the first photosensitive elements 103 and a plurality of columns of the second photosensitive elements 104. In a preferred example, the number of the first photosensitive elements 103 has a one-to-one correspondence with the number of the second photosensitive elements 104, and they are alternately patterned at intervals, the number of photosensitive elements in each first photosensitive element 103 has a one-to-one correspondence with the number of the photosensitive elements in each second photosensitive element 104, forming an arrangement manner as shown in FIG. 5(*a*). Since the corresponding first photosensitive element 103 and the second photosensitive element 104 are adjacent to each other, it may be considered that the intensity of the exposure (dose rate, etc.) of the two adjacent pixels (photosensitive elements) is the same, and the speed at which the signals are generated is the same.

In addition, the first photosensitive elements 103 and the second photosensitive elements 104 may also be arranged side by side, that is, the photosensitive elements 102 are divided into two parts, such as the first photosensitive elements 103 on the left side and the second photosensitive elements 104 on the right side, and the photosensitive elements on the left and right sides are arranged side by side. In addition, referring to FIG. 5(*b*), in an example, the photosensitive elements may also be divided into three groups, that is, the first photosensitive elements 103, the second photosensitive elements 104, and the third photosensitive elements 107. In other examples, of course, it may also be in groups of four or more. In groups of three or more, the arrangement of each photosensitive element after the grouping may be selected according to actual conditions. In an example, the photosensitive elements are divided into three groups: the first photosensitive elements 103, the second photosensitive elements 104 and the third photosensitive elements 107, which are arranged side by side as shown in FIG. 5(*b*).

Referring to FIG. 7, the automatic exposure control component system further includes a switch drive component 400 connected with the sensor to control the opening and closing of the photosensitive elements 102. In an example, each row of the photosensitive elements is simultaneously controlled, and the opening and closing of the photosensitive elements are achieved based on a drive circuit. Image sensor related components generally consist of a photodiode array, a switch array, and switch control lines and signal lines. When the drive circuit sets the switch control line to "on", the readout switch connected with the control line will be turned on, and the signals on the photodiode are sent to the readout circuit through the signal line, and the readout circuit converts the signals into digital signals. In a specific example, referring to FIG. 7, the photosensitive elements 102 are composed of connected readout control switches 403 and photodiodes 404. Each row of the photosensitive elements 102 is controlled by a switch drive line 401. Each column of the photosensitive elements 102 realizes signal control through a signal line 402.

In addition, the automatic exposure control component system further includes a data processing control component connected with the image sensor 100 and the radiation source 108, respectively, so as to acquire the information on the photosensitive elements 102, and at least acquire a preset dose threshold of the area to be tested based on the acquired first readout signal 200 on the first photosensitive elements 103 and the second readout signal 201 on the second photosensitive elements 104, and acquire a remaining time when the area to be tested reaches a preset radiation dose ray radiation based on the preset dose threshold, to control exposure of the radiation source based on the remaining time.

Specifically, in the automatic exposure control component system of the present disclosure, the automatic exposure control of the radiation source is finally realized by the first readout signal 200 and the second readout signal 201, the control method of the present disclosure is realized based on the image sensor 100. The present disclosure directly uses the detector image sensor as the collector of the incident dose, and does not need to additionally place an ionization chamber or other sensors, thereby avoiding that these sensors form shadows on the image after X-ray absorption, which affects clinical diagnosis. Mobile applications are convenient because there is no need for external automatic exposure detection components, such as vacuum ionization chambers. In addition, in the technical solution of the present disclosure, since both readout signals contain the doses generated during the voltage climbing period, the dose value generated during the X-ray stable period may also be obtained based on the first readout signal and the second readout signal (for example, the difference between the two signals is the dose value generated during the X-ray stable period), so that the calculated value of dose rate is greatly improved compared with the traditional method due to the removal of the signals generated during the voltage climbing period (i.e. X-ray unstable period). After the preset dose threshold of the area to be tested is acquired based on the second readout signal 201 and the first readout signal 200, the preset dose threshold may be a dose rate R, thereby a remaining time Tr of the preset radiation dose may be obtained. After obtaining the remaining time, the brake of the radiation source is controlled by the remaining time, so as to realize the automatic exposure control. In an example, the remaining time may be sent to an upper computer or a high voltage control device by a detector device, and then the brake operation is triggered to turn off the X-ray and realize the dose detection and control.

As an example, the data processing control component includes a first signal acquisition module and a second signal acquisition module, the first signal acquisition module is used to obtain the first readout signal through exposing the area to be tested for a first preset time by the radiation source, and the second signal acquisition module is used to obtain the second readout signal through continuously exposing the area to be tested for a second preset time after exposing the area to be tested for a first preset time by the radiation source.

As an example, the data processing control component includes a preset dose threshold acquisition module, the preset dose threshold acquisition module is connected with the first signal acquisition module and the second signal acquisition module, and is configured to acquire the preset dose threshold based on the first readout signals and the second readout signals.

Specifically, the present disclosure realizes automatic exposure control of the radiation source based on at least the first photosensitive elements 103 and the second photosensitive elements 104. As shown in FIG. 4, the radiation source is turned on, that is, the X-ray bulb tube voltage is provided, as shown in the first broken line in FIG. 4. In addition, the photosensitive elements 102 are opened to realize the subsequent readout of the signals of the first photosensitive elements and the second photosensitive elements. In an example, the photosensitive elements may be opened before the radiation source is opened, or may be simultaneously opened with the radiation source, or may be opened after the radiation source is opened. However, it is necessary to ensure that the photosensitive elements are opened before the signals are read out, that is, the photosensitive elements are opened within the first preset time, to ensure that the signals in the pixel flow to the signal line, thereby ensuring the readout of the signals. In this example, both the photosensitive elements and the radiation source are selected to be simultaneously opened. Further, after exposing for the first preset time t1, the signal on the first photosensitive elements 103 is read out to obtain the first readout signal 200. In an example, the first preset time may be a plurality of hundred microseconds. After the first readout signal 200 is read out, continue to keep the radiation source open for a second preset time t2. During the second preset time t2, a signal output continues in the second photosensitive elements 104. The second photosensitive elements 104 undergo exposure for the first preset time and the second preset time, the signal on the second photosensitive elements 104 is then read out, and the second readout signal 201 is obtained. The signal on the second photosensitive elements 104 may be read out after the pixel switch is turned off. The pixel switch is turned off, the signal on the pixel is stopped from flowing to the signal line. At this time, the signal of the corresponding signal line is read out on the second photosensitive elements 104. In an example, the second preset time may be a plurality of hundred microseconds. In an example, when the automatic exposure control system further includes a high voltage control device, such as a high voltage generator, the output of the high voltage control device may be guaranteed to stabilize during the second preset time.

Specifically, in an example, a preset dose threshold of the area to be tested may be acquired based on a difference between the second readout signal 201 and the first readout signal 200. During the process of turning on the pixel switch, the exposure does not stop, and the pixel still generates signals, so that the second readout signal 201 of the second photosensitive elements 104 has a increment δD relative to the first readout signal 200 of the first photosensitive elements 103. The increment δD is proportional to the time difference δT=t2−t1 of the two groups of photosensitive elements acquisition signals, so that the preset dose threshold in the area to be tested may be calculated by δD/δT. In an example, the preset dose threshold of the area to be tested is calculated by δD̄/δT, δD̄ is a comprehensive quantity after processing all the pixel signals of the area. In an example, the number of the first photosensitive elements 103 has a one-to-one correspondence with the number of the second photosensitive elements 104, and they are alternately patterned at intervals. δD̄ may be obtained by calculating the differences between the signals of the adjacent second photosensitive elements and the first photosensitive elements first and then taking the average of the differences. For example, a column of differences may be obtained by calculating the differences between the signals of the first photosensitive elements on the first column and the second photosensitive elements on the second column, and another column of differences may be obtained by calculating the differences between the signals of the first photosensitive elements on the third column and the second photosensitive elements on the fourth column. The rest can be done in the same manner, then each column of differences is taken as a whole to calculate the average.

As an example, the preset dose threshold includes either of a dose rate and a gray value change rate. Specifically, the dose threshold obtained based on the first readout signals and the second readout signals is a dose-related value, which may be a dose rate R, or may be a gray value change rate Rg. That is, the dose threshold may be the dose of the received radiation on the first photosensitive elements and the second photosensitive elements obtained based on the first readout signals and the second readout signals. It may also be a gray value change rate. That is, the image gray value is obtained based on the first readout signals and the second readout signals, which is a digital value converted after the pixel signals are read out, thereby obtaining the gray value change rate and calculating the remaining time Tr to reach the gray value threshold, that is, the remaining time to reach the preset radiation dose, so as to control the exposure of the radiation source based on the remaining time.

As an example, the preset dose threshold acquisition module acquires the preset dose threshold through the first readout signal increment and the second readout signal increment. Specifically, the manner of obtaining the preset dose threshold includes obtaining the preset dose threshold based on the first readout signal increment and the second readout signal increment. The difference between the first readout signal 200 and the first signal background value 202 constitutes the first readout signal increment, the difference between the second readout signal 201 and the second signal background value 203 constitutes the second readout signal increment. The signal of the first photosensitive elements obtained under the condition of no exposure by turning off all the photosensitive elements before the radiation source is opened constitutes the first signal background value 202, and the signal of the second photosensitive elements obtained under the condition of no exposure by turning off all the photosensitive elements before the radiation source is opened constitutes the second signal background value 203.

Specifically, in an example, it also includes a process in which all the pixel (photosensitive elements 102) switches of the image sensor 100 are turned off before the exposure, and the readout circuit corresponding to the area to be tested uses the signal line under the condition that all photosensitive elements are closed and not exposed, that is, a process of acquiring the first signal background value 202 and the second signal background value 203, and obtaining the first readout signal increment and the second readout signal increment based on it. That is, a difference between the first readout signal 200 and the first signal background value 202 constitutes a first readout signal increment, and a difference between the second readout signal 201 and the second signal background value 203 constitutes a second readout signal increment, such that the increments represent the increments of signal generated during the exposure process. The preset dose threshold is then acquired based on the increments, for example, the increment δD and a difference between the second readout signal increment of the second photosensitive elements 104 and the first readout signal increment of the first photosensitive elements 103. For further acquisition manner of the dose threshold, referring to the above technical solution described in this example.

Specifically, the dose threshold obtained based on the first readout signals and the second readout signals is a dose-related value, which may be a dose rate R, or may be a gray value change rate Rg. When sampling the background value, the dose threshold may be acquired based on the first readout signal increment and the second readout signal increment, such as the dose of the received radiation on the first photosensitive elements and the second photosensitive elements. It may also be a gray value change rate. That is, the image gray value is obtained based on the first readout signal increment and the second readout signal increment, which is a digital value converted after the pixel signal is read out, thereby obtaining the gray value change rate and calculating remaining time Tr to reach the gray value threshold, that is, the remaining time to reach the preset radiation dose, so as to control the exposure of the radiation source based on the remaining time.

As an example, the first signal acquisition module includes a plurality of first readout circuits 105, and the second signal acquisition module includes a plurality of second readout circuits 106, each of the first photosensitive elements 103 is composed of a column of the photosensitive elements 102, and each column of the photosensitive elements 102 that constitute the first photosensitive elements 103 is electrically connected with a first readout circuit 105 through a first signal line; each of the second photosensitive elements 104 is composed of a column of the photosensitive elements 102, and each column of the photosensitive elements 102 that constitute the second photosensitive elements 104 is electrically connected with a second readout circuit 106 through a second signal line.

Specifically, referring to FIG. 3, the signals on the photosensitive elements are read out by readout circuits. In a specific example, each column of the photosensitive elements corresponds to a readout circuit. When the photosensitive elements are divided into two groups (the first photosensitive elements 103 and the second photosensitive elements 104), the readout circuits are also divided into two groups, the first readout circuits 105 and the second readout circuits 106, which are placed to correspond with the first photosensitive elements and the second photosensitive elements, so as to read out the signals on the corresponding photosensitive elements of each column.

As an example, the data processing component further includes a data processing module and a transmission control module, the data processing module is connected with the preset dose threshold acquisition module to acquire the remaining time when the area to be tested reaches the preset radiation dose ray radiation based on the output result of the preset dose threshold module. The transmission control module includes either of a high voltage control device 110 and an upper computer, the transmission control module is connected with the data processing module and the radiation source, respectively, so as to receive the result of the data processing module and control the exposure of the radiation source based on the result.

Specifically, in an example, the remaining time may be sent to an upper computer or a high voltage control device, and the brake operation may be triggered to turn off the X-ray and realize the dose detection and control.

As an example, the automatic exposure control component system further includes a support structure 304 for carrying at least the image sensor 100, the switch drive component 400, the first signal acquisition module, the second signal acquisition module, the preset dose threshold acquisition module, and the data processing module. At least the image sensor 100, the switch drive component 400, the first signal acquisition module, the second signal acquisition module, the preset dose threshold acquisition module, the data processing module and the support component constitute a detector device 500. The detector device 500 is placed below a side of the object to be tested away from the radiation source 108, and is connected with the transmission control module.

Specifically, as shown in FIG. 8 and FIG. 9, in the automatic exposure component control system of the present disclosure, the image sensor is included as a part of the detector device 500. In an example, referring to FIG. 8, indirect imaging X-ray detector generally consists of a scintillator 301, an image sensor 100 and related circuits 302 (including the first readout circuits, the second readout circuits, a preset dose threshold acquisition module circuit, and a data processing module circuit), the transmission interface or module 303, the structural member (the support component 304) and other components. In another example, the direct imaging detector has no scintillator, and directly detects the X-ray by the image sensor. The present disclosure directly utilizes the image sensor, and the exposure dose detection function is realized by a specially designed scanning driver and signal readout mode in combination with relevant judgment algorithms.

Figure 10:
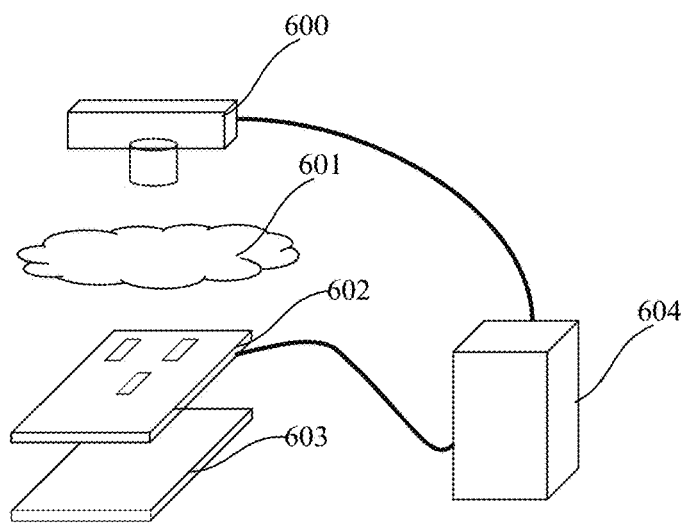
FIG. 10 is a schematic diagram showing the structure of an automatic exposure control component system in a comparative example of the present disclosure.

In addition, referring to FIG. 10, the present disclosure further provides a comparative example. In this example, a vacuum ionization chamber 602 in front of the detector 603 is used to detect the radiation transmitted through areas of interest of the human body 601. When the detected dose value is greater than the set threshold value, the output signal of the vacuum ionization chamber 602 would cause the high voltage generator 604 to brake the X-ray and terminate the exposure. The vacuum ionization chamber 602 may absorb X-rays generated by the X-ray source 600, and the presence of the ionization chamber 602 would result in a loss of dose reaching the X-ray detector, thereby forming an ionization chamber shadow on the image and affecting clinical diagnosis. Although there are a variety of algorithms that can correct the ionization chamber image within a certain spectrum, when the setting of X-ray energy spectrum changes greatly or the incident angle changes greatly, the calibration may easily fail. On the other hand, the ionization chamber and the detector are generally installed separately, making mobile applications more inconvenient.

In summary, the present disclosure provides an automatic exposure control method and an automatic exposure control component system. The control method includes: providing an object to be tested which includes at least one area to be tested; providing an image sensor placed to correspond with the area to be tested, the image sensor includes a photosensitive element array composed of a plurality of photosensitive elements arranged in an array, and the photosensitive element array includes at least a plurality of first photosensitive elements and a plurality of second photosensitive elements; obtaining first readout signals by turning on the radiation source, opening the photosensitive elements, and reading out the signals on the first photosensitive elements after exposing the area to be tested for a first preset time; obtaining second readout signals by keeping the radiation source to continue exposing the area to be tested for a second preset time, turning off the photosensitive elements and reading out the signals on the second photosensitive elements; acquiring the preset dose threshold of the area to be tested based on the second readout signals and the first readout signals, and obtaining the remaining time to which reach the preset radiation dose, so as to control the exposure of the radiation source based on the remaining time. The present disclosure directly utilizes the image sensor, and the exposure dose detection function is realized by a specially designed scanning driver and signal readout mode and relevant judgment algorithms. Both readout signals contain the dose generated during the voltage climbing period, so that the difference between the two signals is the dose value generated during the ray stabilization period, and the calculated value of dose rate is greatly improved compared with the traditional method due to the removal of the signals generated during the voltage climbing period (i.e. X-ray unstable period). In addition, both readout times are designed at the level of 100 microseconds, which is far less than the exposure time of clinical radiography (milliseconds to hundreds of milliseconds), so the dose detection results may be obtained in a timely manner without manual estimation of exposure time, which improves the automation level of dose detection. Through reasonable timing design, the time interval between two acquisitions may be reduced and rapid dose detection may be achieved. Therefore, the present disclosure effectively overcomes various shortcomings and has high industrial utilization value.

The above-described embodiments are merely illustrative of the principles of the disclosure and its effects, and are not intended to limit the disclosure. Modifications or variations of the above-described embodiments may be made by those skilled in the art without departing from the spirit and scope of the disclosure. Therefore, all equivalent modifications or changes made by those skilled in the art without departing from the spirit and scope of the disclosure will be covered by the appended claims.

What is claimed is:

1. An automatic exposure control method, comprising:
providing an object to be tested, the object to be tested comprises at least one area to be tested;
providing an image sensor, the image sensor is placed to correspond with the area to be tested, and comprises a photosensitive element array composed of a plurality of photosensitive elements arranged in an array, and the photosensitive element array comprises at least a plurality of first photosensitive elements and a plurality of second photosensitive elements;
obtaining first readout signals by turning on a radiation source, opening the photosensitive elements, and reading out signals on the first photosensitive elements after exposing the area to be tested for a first preset time;
obtaining second readout signals by keeping the radiation source to continue exposing the area to be tested for a second preset time, turning off the photosensitive elements and reading out the signals on the second photosensitive elements; and acquiring a preset dose threshold of the area to be tested based on the second readout signals and the first readout signals, and acquiring a remaining time when the area to be tested reaches a preset radiation dose ray radiation based on the preset dose threshold, to control the exposure of the radiation source based on the remaining time.

2. The automatic exposure control method according to claim 1, wherein before turning on the radiation source, the method further comprises: controlling all of the photosensitive elements to be turned off to obtain signals of the first photosensitive elements in an unexposed state to obtain first signal background values, and obtain signals of the second photosensitive elements in an unexposed state to obtain second signal background values, wherein a difference between the first readout signal and the first signal background value constitutes a first readout signal increment, a difference between the second readout signal and the second signal background value constitutes a second readout signal increment, and the preset dose threshold of the area to be tested is obtained based on the second readout signal increment and the first readout signal increment.

3. The automatic exposure control method according to claim 2, wherein the preset dose threshold comprises one of a dose rate and a gray value change rate, wherein the preset dose threshold is obtained by a ratio of a difference between the second readout signal increment and the first readout signal increment to a difference between the second preset time and the first preset time.

4. The automatic exposure control method according to claim 3, wherein the number of the first photosensitive elements has a one-to-one correspondence with the number of the second photosensitive elements; and obtaining the difference between the second readout signal increment and the first readout signal increment includes: calculating a difference value between each second photosensitive element and the corresponding first photosensitive element, and taking an average of the difference values.

5. The automatic exposure control method according to claim 1, wherein controlling the exposure of the radiation source based on the remaining time includes controlling the exposure of the radiation source by a correction value of the remaining time.

6. The automatic exposure control method according to claim 1, wherein the first preset time is in a range from 10 to 900 microseconds, and the second preset time is in a range from 10 to 900 microseconds.

7. The automatic exposure control method according to claim 1, wherein each of the first photosensitive elements comprises a column of the photosensitive elements, each of the second photosensitive elements comprises a column of the photosensitive elements, and the first photosensitive elements and the second photosensitive elements are alternately patterned at intervals or arranged side by side; or the photosensitive element array further comprises at least a plurality of third photosensitive elements, each of the third photosensitive elements comprises a column of the photosensitive elements, and the first photosensitive elements, the second photosensitive elements, and the third photosensitive elements are alternately patterned at intervals or arranged side by side.

8. The automatic exposure control method according to claim 7, wherein obtaining the first readout signals by opening the photosensitive elements comprises one of the following: turning on the photosensitive elements simultaneously, row-by-row or column-by-column, or group-by-group; a number of the photosensitive elements opened during obtaining the first readout signals by opening the photosensitive elements includes either of opening the photosensitive elements in the whole area to be tested and opening the photosensitive elements in partial rows in the area to be tested.

9. The automatic exposure control method according to claim 1, wherein signals on the first photosensitive elements are read out through a plurality of first readout circuits, signals on the second photosensitive elements are read out through a plurality of second readout circuits, wherein each of the first photosensitive elements comprises a column of the photosensitive elements, and each column of the photosensitive elements that constitute the first photosensitive elements is electrically connected with one of the first readout circuits through a first signal line, each of the second photosensitive elements comprises a column of the photosensitive elements, and each column of the photosensitive elements that constitute the second photosensitive elements is electrically connected with one of the second readout circuits through a second signal line.

10. The automatic exposure control method according to claim 1, wherein opening the photosensitive elements and reading out the signals on the first photosensitive elements comprises: reading out the signals on the first photosensitive elements after opening the photosensitive elements for a preset opening time and turning off the photosensitive elements, wherein the cut-off of the preset opening time is consistent with the cut-off of the first preset time, and turning off the photosensitive elements and waiting for a preset waiting time to turn on the photosensitive elements again.

11. The automatic exposure control method according to claim 10, wherein the preset waiting time is less than the second preset time, and the preset waiting time is in a range from tens to hundreds of microseconds.

12. An automatic exposure control component system, comprising:
 a radiation source;
 an object to be tested placed to correspond with the radiation source, the object to be tested and the radiation source are spaced by an interval from each other, and the object to be tested comprises at least one area to be tested;
 an image sensor placed to correspond with the area to be tested, the image sensor comprises a photosensitive element array composed of a plurality of photosensitive elements arranged in an array, and the photosensitive element array comprises at least a plurality of first photosensitive elements and a plurality of second photosensitive elements;
 a switch drive component connected with the sensor to control opening and closing of the photosensitive elements; and
 a data processing control component connected with the image sensor and the radiation source respectively, to acquire a preset dose threshold of the area to be tested based on at least first readout signals on the first photosensitive elements and second readout signals on the second photosensitive elements, and to acquire a remaining time when the area to be tested reaches a preset radiation dose ray radiation based on the preset dose threshold, to control the exposure of the radiation source based on the remaining time.

13. The automatic exposure control component system according to claim 12, wherein the data processing control component comprises a first signal acquisition module and a second signal acquisition module, the first signal acquisition module obtains first readout signals through exposing the area to be tested for a first preset time by the radiation source, and the second signal acquisition module obtains second readout signals through continuously exposing the area to be tested for a second preset time after exposing the area to be tested for the first preset time by the radiation source.

14. The automatic exposure control component system according to claim 13, wherein the first signal acquisition module comprises a plurality of first readout circuits, and the second signal acquisition module comprises a plurality of second readout circuits, wherein each of the first photosensitive elements comprises a column of the photosensitive elements, and each column of the photosensitive elements that constitute the first photosensitive elements is electrically connected with one of the first readout circuits through a first signal line; each of the second photosensitive elements comprises a column of the photosensitive elements, and each column of the photosensitive elements that constitute the second photosensitive elements is electrically connected with one of the second readout circuits through a second signal line.

15. The automatic exposure control component system according to claim 13, wherein the data processing control component comprises a preset dose threshold acquisition module, the preset dose threshold acquisition module is connected with the first signal acquisition module and the second signal acquisition module, and is configured to acquire the preset dose threshold based on the first readout signals and the second readout signals, wherein the preset dose threshold acquisition module acquires the preset dose threshold through a first readout signal increment and a second readout signal increment, a difference between the first readout signal and a first signal background value constitutes the first readout signal increment, a difference between the second readout signal and a second signal background value constitutes the second readout signal increment, signals of the first photosensitive elements obtained under a condition of no exposure by turning off all the photosensitive elements before the radiation source is opened constitute the first signal background values, and signals of the second photosensitive elements obtained under a condition of no exposure by turning off all the photosensitive elements before the radiation source is opened constitute the second signal background values.

16. The automatic exposure control component system according to claim 15, wherein the data processing component further comprises a data processing module and a transmission control module, wherein the data processing module is connected with the preset dose threshold acquisition module to acquire the remaining time when the area to be tested reaches the preset radiation dose ray radiation based on an output result of the preset dose threshold module, the transmission control module comprises a high voltage control device or an upper computer, the transmission control module is connected with the data processing module and the radiation source respectively, to receive a result of the data processing module and control the exposure of the radiation source based on the result.

17. The automatic exposure control component system according to claim 16, wherein the automatic exposure control component system further comprises a support component to carry at least the image sensor, the switch drive component, the first signal acquisition module, the second signal acquisition module, the preset dose threshold acquisition module, and the data processing module, wherein at least the image sensor, the switch drive component, the first signal acquisition module, the second signal acquisition module, the preset dose threshold acquisition module, the data processing module and the support component constitute a detector device, the detector device is placed below a side of the object to be tested away from the radiation source, and the detector device is connected with the transmission control module.

18. The automatic exposure control component system according to claim 12, wherein each of the first photosensitive elements is composed of a column of the photosensitive elements, each of the second photosensitive elements is composed of a column of the photosensitive elements, the first photosensitive elements and the second photosensitive elements are alternately patterned at intervals or arranged side by side; or the photosensitive element array further comprises at least a plurality of third photosensitive elements, each of the third photosensitive elements comprises a column of the photosensitive elements, and the first photosensitive elements, the second photosensitive elements, and the third photosensitive elements are alternately patterned at intervals or arranged side by side.

* * * * *